B. F. VICKERY.
FRICTION TOOL HOLDER.
APPLICATION FILED OCT. 28, 1908.

925,854.

Patented June 22, 1909.

WITNESSES:
C. A. Buchanan.
C. L. Maunesehmidt.

INVENTOR
Benj. F. Vickery,
BY
Jno A Buchanan
ATTORNEY

UNITED STATES PATENT OFFICE.

BENJAMIN F. VICKERY, OF GIRARD, ALABAMA.

FRICTION TOOL-HOLDER.

No. 925,854.   Specification of Letters Patent.   Patented June 22, 1909.

Application filed October 28, 1908.   Serial No. 459,959.

*To all whom it may concern:*

Be it known that I, BENJAMIN F. VICKERY, a citizen of the United States, residing at Girard, in the county of Russell and State of Alabama, have invented a new and useful Friction Tool-Holder, of which the following is a specification, it being understood that various changes in the form, proportion, size, and minor details of the structure may be made without departing from the spirit or sacrificing any of the advantages of the invention.

My invention relates to friction tool holders; the objects of which are: First—to provide a tool holder in which the tool or cutter cannot slip. Second—to enable the operator to instantly and accurately adjust the said tool cutter. Third—to eliminate set screws and the attendant lost time, and expense caused by their use. I attain these and other objects by the mechanism shown in the accompanying drawing, in which—

Figure 1:
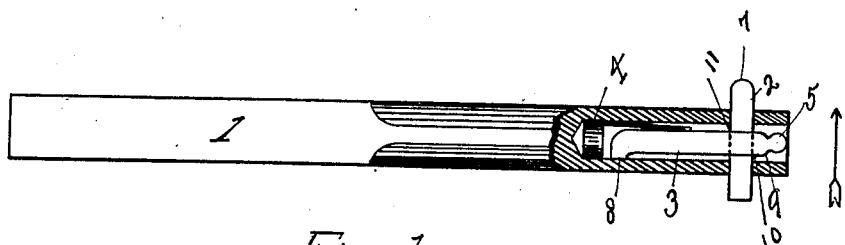
Figure 2:
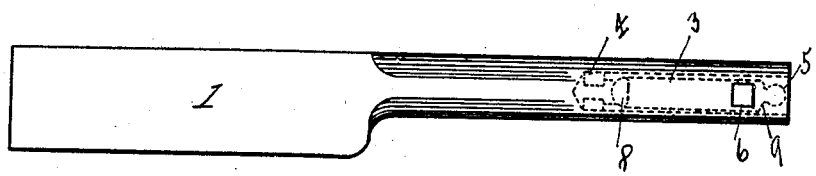

Figure 1, is a plan view partly broken away showing the interior, as well as the exterior mechanism of my device. Fig. 2, is a side elevation with the interior shown by dotted lines.

Similar numerals refer to similar parts in both views.

1, is the tool holder proper, which is made of any suitable material, one end of which is suitably designed for attaching to a lathe, planer, shaper or other machine on which it is to be used. While the opposite end is suitably shaped and bored to receive the tool or cutter 2, the tool clamp 3 and the tension member 4, the said tool clamp 3 may be of any suitable design or material and is provided with a cavity near its outer extremity, which extends entirely through it and corresponds with a similar cavity 6 in the said tool holder. These cavities are for the reception of the tool or cutter 2 and may be disposed at any angle suitable for the work to be done or the machine it is used on. The extreme outer end 5 of the said tool clamp 3 is designed in such a manner as to enable the operator to grasp it for adjustment, insertion or removal. The tension member 4 may be of any suitable design or material so long as it exerts a pressure on the said tool clamp 3, but the design shown is preferred.

This device is operated or used just as the ordinary tool holder, but one of its most important features is the absence of "set" screws as the cavity in the tool clamp 3 previously referred to is slightly larger than the tool or cutter 2, and when the cutting edge 7 of the latter comes in contact with the work, it naturally has a tendency to force the said tool 2 back from the said work, but the inner extremity 8 of the said tool clamp 3 cannot move in a direction away from the said work since it is already touching the wall of the tool holder 1. The outer extremity 9 of the said tool clamp 3 does move in a direction away from the said work thereby forming contact of the said tool clamp 3 with said tool or cutter 2 at the points 10, and 11 when this contact is formed the said tool or cutter 2 can move no farther, but as more pressure is applied it holds stronger, but said tool or cutter can easily be moved in the direction indicated by the arrow since both ends are free and will admit of a right line movement, it is therefore evident that the function of the tension member 4 is to hold the said tool clamp 3 in its proper position and prevent it from dropping out of the said tool holder 1 when the tool or cutter 2 is removed.

Having thus described my invention, what I claim and desire to secure by Letters Patent is:

In a friction tool holder the combination of a longitudinal bar of suitable material having one end adapted to engage the usual fastenings of machines on which this kind of tool is commonly used, the opposite end of suitable design and having a longitudinal cavity extending into it a suitable depth, and a transverse perforation intersecting the longitudinal bar at any angle desired, a clamping bar within said longitudinal cavity the outer extremity of which is of such construction as will facilitate adjustment, removal or insertion and having an opening near the said outer extremity extending through it at an angle corresponding with the said transverse perforation in the said longitudinal bar, adapted to receive and hold a cutting member, and having a resilient member bearing transversely on one side at its inner end to hold the said clamping bar in its proper position, substantially as shown and described.

In testimony that I claim the foregoing as my own I have hereto signed my name in the presence of two witnesses.

BENJAMIN F. VICKERY.

Witnesses:
W. D. COOPER,
A. H. COOPER.